3,044,856
CAUSTIC REGENERATION PROCESS

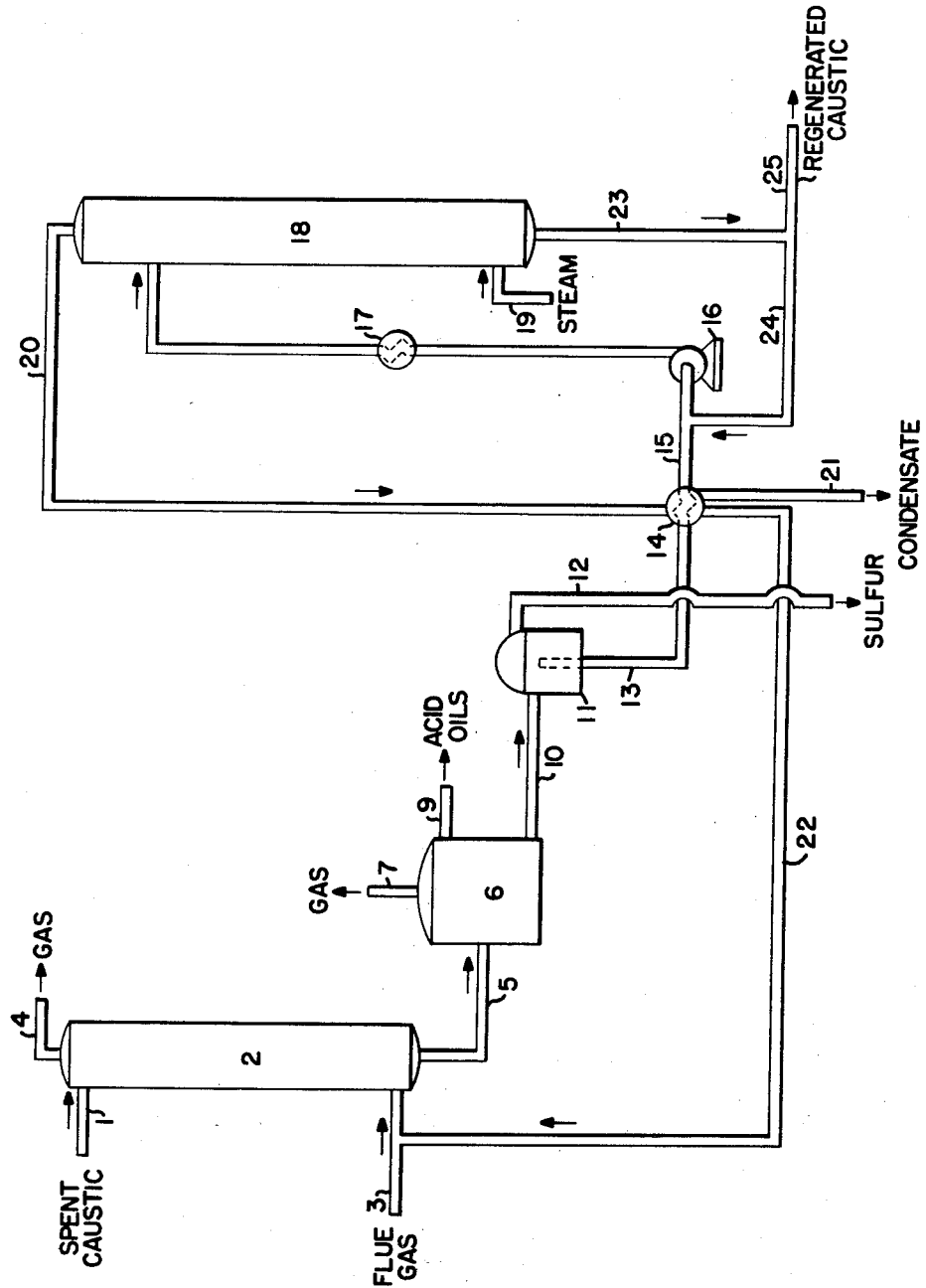

Marcus Bernard Shirley, Southbourne, England, and Arthur M. Thomas, Jr., Rahway, N.J., assignors to Esso Research and Engineering Company, a corporation of Delaware
Filed Apr. 21, 1958, Ser. No. 729,859
7 Claims. (Cl. 23—184)

The present invention relates to the removal of impurities from alkali metal hydroxide solutions and more particularly relates to an improved process for the regeneration of spent caustic and similar alkali metal hydroxide solutions containing sulfides, mercaptides, phenolates, thiophenolates, naphthenates and the like.

Processes employing caustic for the sweetening of hydrocarbon oils and for the removal of acidic constituents from such oils are well known and are widely used throughout the petroleum industry. In such processes sulfides, mercaptans, phenols, thiophenols, cresols, xylenols, naphthenic acids and the like are extracted from the oil and converted into sodium salts which are retained in the caustic. Because of the large excesses of caustic required in these processes, periodic regeneration for the removal of the contaminants from the caustic is necessary if the processes are to be economically feasible. Normally, this regeneration is accomplished by heating the spent caustic solution to a temperature of from about 220 to about 280° F. and then stripping it at that temperature with steam. Sodium mercaptides present in the caustic are hydrolyzed to mercaptans and removed by the steam stripping. Sodium sulfide and other sodium salts present in the caustic are not affected by this treatment, however, and hence the regeneration is only a partial one. The impurities not removed by this partial regeneration accumulate in the caustic solution until it loses its effectiveness as an extracting agent or until it tends to form stable emulsions with the oil being treated. At that point it is necessary to discard the solution and replace it with fresh caustic.

Because of the expense involved in discarding caustic in this manner and because of the difficulty in disposing of large quantities of spent caustic without causing stream pollution, much research effort has been directed in recent years toward the problem of developing new and improved processes for caustic regeneration. A great many potential processes have been suggested, including treatment with oxygen or ozone, biological oxidation and electrolytic treating. None of these processes has proved satisfactory.

The present invention provides a new and improved process for regenerating caustic and other alkali metal hydroxide solutions spent in treating hydrocarbon oils which is greatly superior to earlier processes. In accordance with the invention, it has now been discovered that sulfides, mercaptides, phenolates, thiophenolates, naphthenates and other contaminants normally present in caustic and other alkali metal hydroxide solutions spent in the treatment of hydrocarbon oils can be readily removed therefrom by means of an improved process wherein the hydroxide is first converted into the corresponding carbonate and bicarbonate and thereafter reconstituted by means of a high temperature-high pressure hydrolysis reaction. The carbonation reaction results in not only the conversion of the hydroxide to the carbonate and bicarbonate but also in the conversion of the sulfides to colloidal sulfur and the transformation of the mercaptides, phenolates and naphthenates to free organics. Both the sulfur and the free organics can be readily separated from the carbonate before it is hydrolyzed. The hydroxide can therefore be recovered substantially free of contaminants. The invention thus provides an essentially complete regeneration process, obviates the necessity for disposing of large quantities of spent reagent and reduces the overall cost of processes wherein a hydrocarbon oil is treated with caustic or a similar alkali metal hydroxide solution.

The process of the invention may be used for the removal of contaminants such as sulfides, phenolates, thiophenolates, mercaptides, naphthenates and the like from alkali metal hydroxide solutions and it not limited to the treatment of caustic or sodium hydroxide solution. Lithium hydroxide and potassium hydroxide solutions are particularly susceptible to treatment in accordance with the invention. The process will, however, find primary application in the regeneration of caustic solutions used in the refining of hydrocarbon oils. Such caustic solutions may range from about 1 to about 30° Baumé and thus contain from about 1 to about 25% sodium hydroxide. Normally they have a concentration of about 15° Baumé and thus contain about 11% sodium hydroxide. The extent to which such caustic streams are utilized before being discarded is determined by the concentration at which contaminants tend to re-enter the oil from the caustic solution, rather than by the concentration of the caustic itself. In most refinery operations the caustic is generally about 50 to 60% spent before it is discarded. It has been found that dilute spent caustic streams may be more easily regenerated in accordance with the invention and therefore it is generally preferred to dilute the spent caustic stream to a concentration of from about 1 to 5% sodium hydroxide. Concentrations of from 1 to 2% are especially preferred. Since the regeneration process of the invention makes the disposal of large quantities of caustic unnecessary, it may henceforth be advantageous to employ dilute caustic solutions, rather than concentrated solutions, in hydrocarbon oils treating processes.

The carbonation step of the process is carried out by contacting the caustic solution to be regenerated with carbon dioxide or a gas stream containing carbon dioxide, such as flue gas. Refinery flue gas streams normally contain from about 5 to about 10% carbon dioxide by volume and are particularly adapted for use in the process of the invention. The contacting temperature during the carbonation step may range from about 60 to about 150° F. lower temperatures being generally preferred. Contacting of the spent caustic with the carbon dioxide at about 100° F. is particularly effective. In the carbonation step of the process, the caustic is preferably converted completely to the bicarbonate in order to assure complete reaction of the phenols, mercaptides and other contaminants in the caustic. The extent of conversion can be determined by measuring the pH of the solution. The hydroxide solution will ordinarily have a pH of about 14. A pH of about 11 indicates conversion of the hydroxide to the carbonate. Complete conversion to the bicarbonate is indicated by a pH of about 8. The amount of carbon dioxide employed will vary considerably depending upon the concentration of the spent caustic solution and the contacting conditions employed.

Following the carbonation step of the process, mercaptides, phenols and similar contaminants released during the carbonation step are separated from the solution by decanting, solvent extraction or a similar separation step. These contaminants form an oily layer on top of the solution and will generally constitute from about 0.5 to about 1% of the solution by volume. Sulfides present in the caustic are converted to colloidal sulfur which may readily be filtered from solution. The phenols and naphthenic acids are slightly more soluble in the carbonated solution than are the thiophenols and will in part be carried over to the hydrolysis step of the process. These are, for the most part, subsequently removed during the hydrolysis reaction.

In order to recover the hydroxide from the carbonated solution formed during the carbonation step of the process, the solution is stripped with steam at a temperature of from about 400 to about 700° F. It has been found that elevated temperatures are essential for the conversion step and that temperatures of from about 500 to about 600° F. are particularly effective. The steam employed may be either saturated steam or superheated steam and thus pressures of from about 250 to 1500 p.s.i.g. may be used. Although temperature increases hydrolysis of the carbonate to the hydroxide, increased pressure reduces the reaction rate because carbon dioxide is formed in the process. It is therefore preferred to employ superheated steam rather than saturated steam. The solution must, of course, be maintained in the liquid phase in order for the hydrolysis reaction to take place. The steaming rate may be varied from about 0.5 to about 5.0 pounds of steam per pound of solution per hour and will preferably range from about 0.75 to about 1.0 pound of steam per pound of solution per hour. The solution may be treated with steam for a period from about ½ to about 10 hours. Treatment for about 4 to 6 hours is generally preferred. Since only a small amount of the heat in the steam employed in the process is lost, it will generally be advantageous to recover the steam and use it in other processes.

The nature and objects of the invention may be better understood from the following detailed description of a preferred embodiment of the process and from the accompanying drawing illustrating that embodiment.

Referring now to the drawing, a spent caustic solution containing sulfides, mercaptides, phenolates, thiophenolates, naphthenates and other contaminants derived from the treatment of hydrocarbon oils is introduced at ambient temperature through line 1 into contacting zone 2. The spent caustic concentration may range from about 1 to about 25% sodium hydroxide and preferably contains from about 1 to about 2% sodium hydroxide. Contacting zone 2 is preferably a countercurrent liquid gas contacting zone fitted with trays or packed with Raschig rings, stoneware saddles or the like but other conventional contacting apparatus may also be employed. A gas stream containing from about 1 to about 15% or more of carbon dioxide, a refinery flue gas stream containing about 10% carbon dioxide, for example, is introduced into the lower portion of contacting zone 2 through line 3 and flows upwardly countercurrent to the descending stream of spent caustic. Gas stripped of carbon dioxide is taken off overhead from the contacting zone through line 4. Conversion of the hydroxide solution to the carbonate and bicarbonate takes place in zone 2 and the carbonated solution having a pH of about 8 is withdrawn from the contacting zone through line 5 and passed to settling zone 6.

In the settling zone, carbon dioxide and other gases dissolved in the carbonated solution are taken off overhead through line 7. An oily layer consisting principally of aromatic phenols but also containing mercaptans and other organic contaminants is formed at the top of the settling zone and is removed therefrom through line 9. The carbonated solution containing colloidal sulfur as a result of the conversion of disulfides is removed from the settling zone through line 10 and passed into filtration zone 11. A continuous rotary type filter is preferably employed but plate-and-frame and other type filters may also be used. Sulfur is filtered from the solution and removed from the filtration zone through line 12. The filtrate, consisting almost entirely of sodium carbonate and bicarbonate, is withdrawn through line 13 and passed through preheater 14 where it is raised to a temperature of from about 200 to about 250° F. The heated solution is then passed through line 15, pump 16, into heater 17 where it is heated to the hydrolysis temperature, about 500 to about 600° F., for example. The heated solution is then introduced into hydrolysis zone 18.

Steam at a temperature of from about 500 to about 600° F. and at a pressure of from about 700 to about 1600 p.s.i.g. or greater is introduced into the hydrolysis zone through line 19. The steam countercurrently contacts the downflowing solution and is removed from the top of the hydrolysis zone through line 20. This steam is then passed into preheater 14 where it serves to preheat the filtered solution from filter 11. Condensate is withdrawn through line 21. The condensate stream contains phenols which were not removed in the separation step of the process and were carried over to the hydrolysis zone. Carbon dioxide is removed from preheater 14 through line 22 and recycled to line 3 where it is mixed with the incoming flue gas. The hydrolyzed solution is withdrawn from the bottom of zone 18 through line 23. A portion of this solution may be recycled to the preheated carbonate and bicarbonate stream in line 15. The remainder of the hydrolyzed solution is withdrawn through line 25 as the regenerated caustic product. Normally, this product will contain from about 5 to about 30% or more of sodium carbonate. If desired, this carbonate may be separated from the hydroxide but this is generally unnecessary, since the presence of the carbonate is not objectionable in caustic to be used for treating hydrocarbon oils and is often desirable because of its effectiveness for the removal of hydrogen sulfide from such oils. No bicarbonate will be present, since the bicarbonate and hydroxide cannot co-exist in the same solution. The concentration of the regenerated caustic stream will largely depend upon the degree at which the spent caustic was diluted prior to carbonation. In some cases it may be desirable to concentrate the regenerated caustic by further heating.

The process of the invention may be still further illustrated by reference to the following examples.

EXAMPLE 1

A spent caustic stream containing mercaptides, sulfides, phenolates, thiophenolates and naphthenates was treated at ambient temperature with carbon dioxide until the solution had a pH of 7.8. 76% of the hydroxide was converted to sodium bicarbonate and 24% was converted to sodium carbonate. This solution was then diluted with 100 parts of water and heated in a pressure vessel. Saturated steam at a pressure of 300 p.s.i. and a temperature of about 417° F. was then blown through the solution. Upon cessation of the steaming, the solution was analyzed and found to contain 26% sodium carbonate and 73% sodium hydroxide.

EXAMPLE 2

In order to determine the effect of treatment with carbon dioxide followed by hydrolysis upon contaminants present in a spent caustic solution, a spent caustic obtained from a petroleum refinery was treated with carbon dioxide at 100° F. and a pressure of 4 pounds per square inch absolute. Samples of the solution were withdrawn at intervals and analyzed to determine the amounts of contaminants present therein. Operation was continued until no more carbon dioxide was absorbed by the caustic solution. An oily layer of thiophenols and the like was decanted from the solution and colloidal sulfur was filtered therefrom. The solution was then analyzed and its contaminants content was compared with that of the feed solution. The results of this comparison are shown in Table I.

Table I
EFFECT OF CARBONATION UPON CAUSTIC CONTAMINANTS

| Component | Spent Caustic Feed | Carbonated Effluent | Percent Removal |
|---|---|---|---|
| Phenols, Wt. percent | 21 | 0.3 | 98.5 |
| Naphthenic Acids, Vol. percent | 10 | 0.1 | 99.0 |
| Mercaptan No., mgs./100 ml | 550 | 0.3 | 100 |
| Sulfide No., mgs./100 ml | 88 | 0.0 | 100 |

From the above table it can be seen that essentially all of the phenols, naphthenic acids, mercaptans and sulfides were removed from the spent caustic by treatment with carbon dioxide in accordance with the invention. The process thus permits essentially complete regeneration of spent caustic solutions containing such contaminants. The above data are based upon complete conversion of the hydroxide to the bicarbonate. To show the importance of the degree of conversion, a sample withdrawn at the point where the hydroxide had been converted only to the carbonate was analyzed and the amounts of phenol, naphthenic acid, mercaptan and sulfide contaminants therein were noted. For the sake of comparison, these are shown in Table II with the corresponding values for the hydroxide and bicarbonate solutions.

Table II
EFFECT OF DEGREE OF CARBONATION ON CONTAMINANTS REMOVAL

| Contaminants | Solution | | |
|---|---|---|---|
| | NaOH | Na₂CO₃ [1] | NaHCO₃ |
| Phenols, Wt. percent | 21 | 5.4 | 0.3 |
| Acid Oils, Vol. percent | 10 | 0.2 | 0.1 |
| Mercaptans, Mgs./100 cc | 550 | 320 | 0.3 |
| Sulfides, Mgs./100 cc | 88 | 88 | 0.0 |
| pH | 14+ | 11 | 8 |

[1] Based on CO₂ added.

As can be seen from Table II, conversion of the hydroxide merely to the carbonate left most of the mercaptan and sulfide contaminants in solution. It is therefore advantageous to carry out the carbonation until a substantial amount or all of the hydroxide has been converted to the bicarbonate.

EXAMPLE 3

A spent caustic solution treated with carbon dioxide as in the preceding example in order to convert the hydroxide to sodium bicarbonate was treated with steam at various temperatures in order to determine the effect of steam temperature and treating time upon conversion of the carbonate and bicarbonate to the hydroxide. The carbonated solution had a concentration of about 1%. The solution was placed in an agitated pressure vessel and the solution was then heated to the reaction temperature by means of an electrical heating element. When the desired temperature and pressure conditions had been attained, steam was introduced into the lower portion of the vessel through a porous metal disc. Steam was taken overhead from the vessel and condensed. Samples of the solution in the vessel were taken at hourly intervals and were analyzed to determine the extent to which the carbonated solution had been converted to the hydroxide. Runs were made at 4 different temperatures ranging between 410° F. and 594° F. Steam pressures varied correspondingly. Percent conversion is expressed in accordance with the following formula:

$$\text{Percent conversion} = \frac{\text{NaOH (as Na}_2\text{CO}_3\text{)}}{\text{NaOH (as Na}_2\text{CO}_3\text{)} + \text{Na}_2\text{CO}_3} \times 100$$

The results of these runs are shown in Table III.

Table III
EFFECT OF TIME AND TEMPERATURE UPON CARBONATE CONVERSION

| Steaming Temperature, °F | Conversion of Carbonate to Hydroxide, percent | | | | | | |
|---|---|---|---|---|---|---|---|
| | 1 Hour | 2 Hours | 3 Hours | 4 Hours | 5 Hours | 6 Hours | 7 Hour |
| 410 | 22.9 | 31.6 | 38.4 | 46.9 | 48.1 | 52.1 | 60.2 |
| 493 | 37.4 | 47.2 | 59.9 | 66.9 | 71.2 | 77.6 | 80.4 |
| 550 | 45.9 | 58.2 | 60.9 | 73.4 | 80.1 | 87.4 | |
| 594 | 36.3 | 48.7 | 62.1 | 74.3 | 77.1 | 86.7 | 92.6 |

The above data show that substantially better conversion of the carbonate to the hydroxide was obtained at 550° F. than was possible at lower temperatures. Conversion to the hydroxide increased over the life of each run. Analysis of the data in Table III and similar data indicate that the conversion rate begins to decrease at temperatures above about 600° F. and that the optimum hydrolysis temperature will normally range between about 500 and 600° F. Treatment for 7 hours at 594° F. resulted in a 93% conversion. Continuation of the run for longer periods would result in a slightly higher conversion level.

EXAMPLE 4

In order to demonstrate the effect of solution concentration upon conversion of the carbonate and bicarbonate to the hydroxide in the hydrolysis step of the process, runs similar to those in the preceding example were carried out except that the concentration of the solution was varied from 1% to 4.8%. Again, the degree of conversion was determined at hourly intervals. As shown in Table IV, it was found that the degree of conversion decreases with increases in the concentration of the carbonated solution. These data illustrate the advantage of diluting the spent hydroxide solution prior to regeneration in accordance with the process of the invention.

Table IV
EFFECT OF CONCENTRATION UPON CARBONATE CONVERSION

| Carbonate Concentration, percent | Conversion of Carbonate to Hydroxide, percent | | | | | | |
|---|---|---|---|---|---|---|---|
| | 1 Hour | 2 Hours | 3 Hours | 4 Hours | 5 Hours | 6 Hours | 7 Hours |
| 1 | 36.3 | 48.7 | 62.1 | 74.3 | 77.1 | 86.7 | 92.6 |
| 2.5 | 20.6 | 32.5 | 37.1 | 48.2 | 51.4 | 57.2 | |
| 4.8 | 11.6 | 17.9 | 21.8 | 26.6 | 29.2 | 37.3 | |

EXAMPLE 5

To further illustrate the effect of solution concentration upon hydrolysis of the carbonated solution of the hydroxide, sodium carbonate solutions of three different concentrations were steamed under identical conditions. The degree of conversion and the carbonate and hydroxide concentrations of each were then determined. These are reported below as Cases I, II and III.

CASE I 1500 cc. of 1% Na₂CO₃ solution steamed for 1 hour at 594° F., 1400 p.s.i.g. at 1000 cc. steam per hour.
Conversion = 46.%.
NaOH formed = 0.0105 lb.
Concentration of resulting solution: NaOH = 0.35%, Na₂CO₃ = 0.54%.

CASE II 1500 cc. of 2.5% Na₂CO₃ solution for 1 hour at 594° F., 1400 p.s.i.g. at 1000 cc. steam per hour.
Conversion = 21.%.
NaOH formed = 0.0131 lb.
Concentration of resulting solution: NaOH = 0.40%, Na₂CO₃ = 1.97%.

CASE III 1500 cc. of 4.8% $Na_2CO_3$ steamed for 1 hour at 594° F., 1400 p.s.i.g. at 1000 cc. steam per hour.

Conversion=12.%.

NaOH formed=0.0144 lb.

Concentration of resulting solution: NaOH=0.44%, $Na_2CO_3$=4.22%.

The amount of steam consumed in each of the three cases above was the same. The total amount of sodium hydroxide formed increased as the concentration of the feed was increased. The concentration of sodium hydroxide as compared to the concentration of sodium carbonate decreases, however, with increasing feed concentration. The advantage of using dilute solutions is apparent.

EXAMPLE 6

Still other runs were carried out in which the steaming rate was varied and the effect of such variation on conversion of the carbonate was measured. The procedure in these runs was again similar to that described in Example 2. The effect of a change in the steam rate of from 500 to 1000 ml. per hour upon the conversion of solutions containing 1%, 2.5% and 4.9% carbonate is shown in Table V. The data indicate that high steam rates are desirable. The effect of diluting the solution to be hydrolyzed and the improved conversion when high temperature steam is used are also shown by the data in Table V.

*Table V*

EFFECT OF STEAMING RATE ON CARBONATE CONVERSION

| Steaming Conditions | Carbonate Concentration, percent | Conversion of Carbonate to Hydroxide, percent | | | | | |
|---|---|---|---|---|---|---|---|
| | | 1 Hour | 2 Hours | 3 Hours | 4 Hours | 5 Hours | 6 Hours |
| 1,000 ml. 552° F. Steam/hr | 1 | 45.9 | 58.2 | 60.9 | 73.4 | 80.1 | 87.4 |
| 500 ml. 552° F. Steam/hr | 1 | 34.1 | 45.1 | 55.2 | 67.3 | 76.9 | |
| 1,000 ml. 593° F. Steam/hr | 2.5 | 20.6 | 32.5 | 37.1 | 48.2 | 51.4 | 57.2 |
| 500 ml. 593° F. Steam/hr | 2.5 | 14.6 | 23.8 | 27.3 | 32.7 | 40.6 | |
| 1,500 ml. 410° F. Steam/hr | 4.9 | 8.2 | 13.7 | 17.2 | 20.9 | 21.9 | 24.1 |
| 500 ml. 410° F. Steam/hr | 4.9 | 5.4 | 8.3 | 9.6 | 11.5 | 14.8 | 15.2 |

EXAMPLE 7

Further runs similar to those described in the preceding examples were carried out to determine the effect of contacting conditions upon conversion of the carbonate and bicarbonate to the hydroxide in the hydrolysis step of the process. In one set of runs steam was introduced into the solution to be hydrolyzed through a porous disc under conditions such that excellent contacting should theoretically occur. Runs in which the porous disc was replaced by a sample dip leg, giving theoretically poor contacting conditions, were also made. When the conversion rates for these two sets of runs were compared, it was found that there was substantially no difference in the extent to which conversion took place. It therefore appears that the contacting conditions employed during the hydrolysis step of the process are not critical and that any of a large number of contacting methods conventionally employed with vapor liquid systems will be suitable for use in the process of the invention. In some instances, for example, it may be preferred simply to carry out the process in a boiler of the conventional water tube type or in similar apparatus.

It will be understood that, while the process has been described primarily in terms of regenerating caustic solutions spent in the treating of hydrocarbon oils, it is not limited to such caustic solutions and may be employed for the removal of sulfides, mercaptides, phenolates, thiophenolates, naphthenates and similar organic contaminants from any alkali metal hydroxide solution, regardless of the source of the contaminants. Many modifications in the process described in the preferred embodiment set forth above will be obvious to those skilled in the art and may readily be made without departing from the scope of the invention.

What is claimed is:

1. An improved process for the regeneration of an alkali metal hydroxide solution containing mercaptides, sulfides, naphthenates and phenolic contaminants which comprises contacting said solution with a carbon dioxide-containing gas to carbonate said solution to convert a substantial portion of said alkali metal hydroxide to alkali metal bicarbonate and to convert at least a portion of said contaminants into insoluble materials, withdrawing said insoluble materials from the carbonated solution, contacting said carbonated solution with steam at a temperature of from 400° F. to about 700° F. and at a pressure above 250 p.s.i.g., and recovering regenerated alkali metal hydroxide solution.

2. A process as defined in claim 1 wherein said carbon dioxide-containing gas is flue gas.

3. An improved process for the regeneration of a spent caustic soda solution containing dissolved contaminants obtained from the treatment of a hydrocarbon oil which comprises contacting said solution with carbon dioxide-containing gas to convert the caustic soda solution into bicarbonate having a pH of about 8 and to form insoluble materials from said contaminants, withdrawing said insoluble materials from the carbonated solution, contacting said carbonated solution with steam at a temperature of from about 400° F. to about 700° F. and at a pressure of from about 250 p.s.i.g. to about 1500 p.s.i.g., and recovering the regenerated caustic solution.

4. A process as defined by claim 3 wherein said caustic solution is diluted to a concentration of about 1 to 2% prior to carbonation.

5. An improved process for regenerating a caustic soda solution containing contaminants obtained by treating a sulfur-containing hydrocarbon oil which comprises contacting said solution with a carbon dioxide-containing gas to convert the caustic soda to the bicarbonate and to form insoluble materials from said contaminants, removing said insoluble materials from said solution, contacting said solution with superheated steam at a temperature of from about 500° F. to about 600° F., and recovering regenerated caustic soda solution.

6. An improved process for the regeneration of an alkali metal hydroxide solution containing mercaptides, sulfides, naphthenates and phenolic contaminants which comprises contacting said solution with a carbon dioxide containing gas, changing the pH from about 14 to about 8, to convert the hydroxide to bicarbonate, and to convert at least a portion of said contaminants into insoluble materials, separating the insoluble materials from the carbonated solution, contacting said carbonated solution with steam at a temperature of from 400 to 700° F. and at a pressure above 250 p.s.i.g. to hydrolyze the bicarbonate to hydroxide, and recovering regenerated metal hydroxide solution.

7. An improved process for the regeneration of an alkali metal hydroxide solution containing mercaptides, sulfides, naphthenates and phenolic contaminants which comprises contacting said solution with carbon dioxide gas, changing the pH from about 14 to about 8, to convert the hydroxide to bicarbonate, and to convert at least a portion of said contaminants into insoluble materials, separating the insoluble materials from the carbonated solution, contacting said carbonated solution with steam at a temperature of from 500 to 600° F. and at a pressure of about 250 p.s.i.g. to about 1500 p.s.i.g. at a rate of about 0.75 to about 1.0 pound of steam per pound of solution per hour for a period of from about ½ to about 10 hours to hydrolyze the bicarbonate to hydroxide, and recovering regenerated metal hydroxide solution.

References Cited in the file of this patent

UNITED STATES PATENTS

| | | |
|---|---|---|
| 152,845 | Juron et al. | July 7, 1874 |
| 1,942,071 | Smith | Jan. 2, 1934 |
| 2,001,715 | Fischer | May 21, 1935 |
| 2,003,734 | Broadhurst | June 4, 1935 |
| 2,317,054 | Henderson et al. | Apr. 20, 1943 |
| 2,317,600 | Benedict | Apr. 27, 1943 |
| 2,617,833 | Kalichevsky | Nov. 11, 1952 |

FOREIGN PATENTS

| | | |
|---|---|---|
| 748,124 | Great Britain | Apr. 25, 1956 |